UNITED STATES PATENT OFFICE.

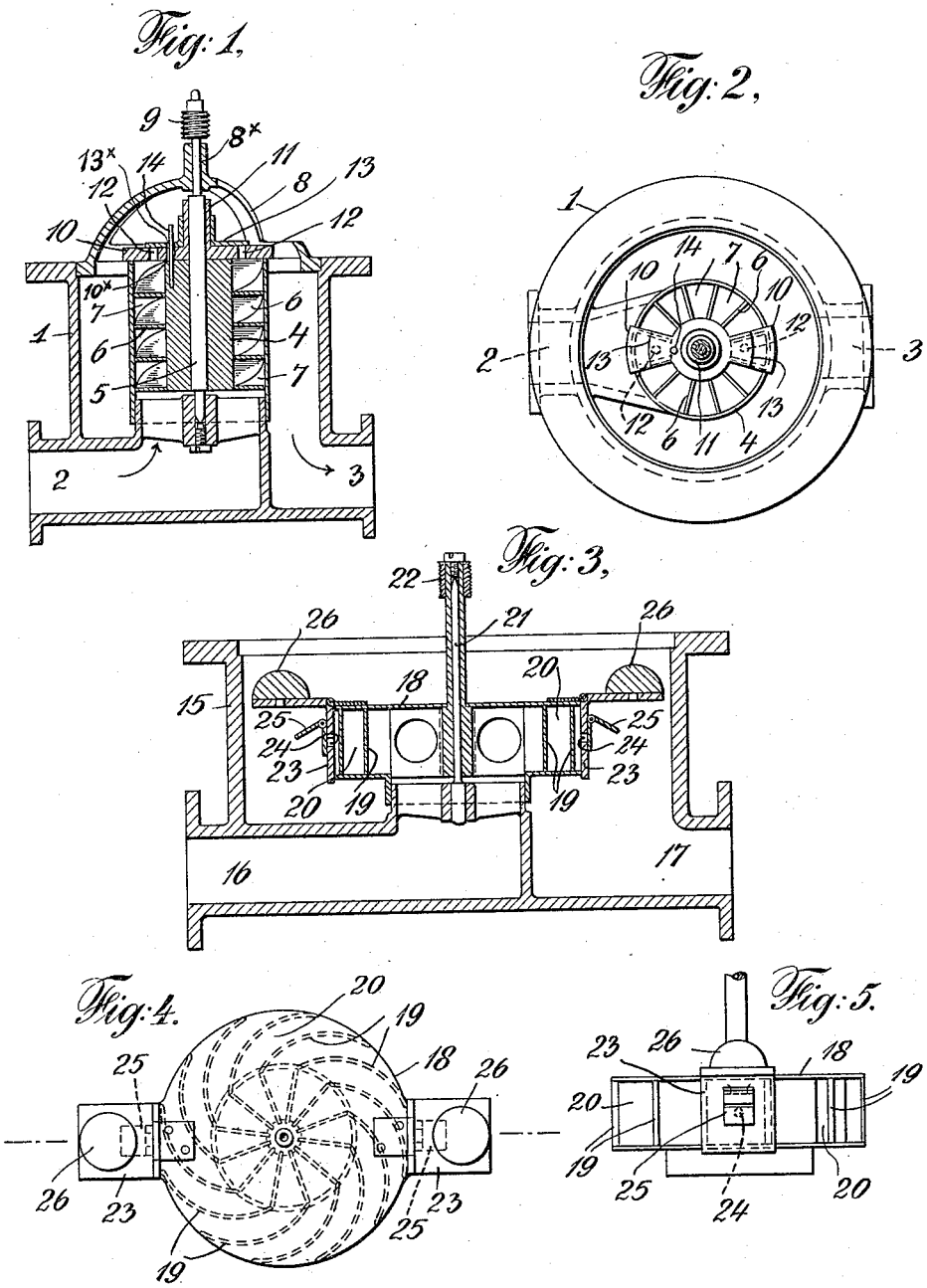

FRANK LAMBERT, OF BROOKLYN, NEW YORK.

CONTINUOUS-FLOW METER.

1,148,593.  Specification of Letters Patent.  Patented Aug. 3, 1915.

Application filed March 15, 1911. Serial No. 614,614.

*To all whom it may concern:*

Be it known that I, FRANK LAMBERT, a citizen of the United States, and a resident of Brooklyn, in the county of Kings and State of New York, have invented certain new and useful Improvements in Continuous-Flow Meters, of which the following is a specification.

My invention relates generally to meters, and particularly to continuous flow fluid meters, more especially, water meters. Such meters have, for many purposes, distinct and important advantages as compared with positive displacement meters; for example, even if the movable driving member of a continuous flow meter is held stationary for any reason, such as jamming of the mechanism, a free passage for the flow of the water or other fluid remains; whereas, in the case of a positive displacement meter, if the mechanism jams, the flow of water or other fluid through the meter is prevented. One serious objection to continuous flow meters as heretofore constructed has been, that at medium and small flows they are inaccurate, and at very low flows they may fail to register altogether.

The objects of my invention are, to render such meters more nearly accurate in the measurement of medium and small flows, and to accomplish this object by simple, inexpensive, reliable, and automatic means.

According to my invention, means is provided for automatically varying the effective area of the flow-passages of the rotary driving member of the meter, when the flow through the meter is otherwise too slow for accurate registry; whereby the velocity of flow through said passages of the rotary driving member is caused to be proportionately greater, and great enough to actuate said rotary driving member at a speed proportionate to the actual rate of flow. Such restriction is substantially proportionate to the predetermined error which would otherwise exist in the registration by the meter, and substantially compensates for such error.

I will now proceed to describe my invention with reference to the accompanying drawings, in which two forms of continuous flow meter embodying my invention are illustrated, more or less diagrammatically, and will then point out the novel features in the claims.

In said drawings: Figure 1 shows a vertical section through one form of continuous flow meter, having its rotor arranged for axial discharge, the registering mechanism and top of the casing being omitted, and Fig. 2 shows a top view of the mechanism shown in Fig. 1, the top bearing spider being omitted. Fig. 3 shows a vertical section through another form of continuous flow meter, having its rotor arranged for lateral discharge, the registering mechanism and the top of the case inclosing the rotor being omitted; Fig. 4 shows a top view of the rotor, and Fig. 5 a side view thereof.

When a current of water or other fluid is passed through the rotor of a meter, the several streams into which said current is divided by the vanes of the rotor, pass through the passages between said vanes at a speed proportionate to the capacity of said passages and to the rate of delivery of the liquid from the meter. For example, if the cubic capacity of the passages of the rotor is 10 cubic inches, and the discharge from the meter is at the rate of one cubic inch per second, at the end of ten seconds the rotor will have discharged once. If there are ten passages in the rotor, each passage will have discharged one cubic inch in ten seconds. But the meter may register only 8 cubic inches in the time stated, showing that the leakage, retardation, or slip of the rotor amounts to 20 per cent. But if two of the ten passages of the rotor were blocked, so that no flow could take place through them, the flow through the remaining passages would be proportionately more rapid, and so would cause the rotor to move at a higher speed sufficient to compensate, approximately, for such leakage or slip; so that, under the conditions assumed, blocking two of the ten passages of the rotor would cause the meter to register approximately correctly at the low rate of flow; and by blocking four of the passages the meter would register twenty per cent. more fluid than actually delivered; this being desirable, at times, to compensate for occasional flow at too low rate to be registered at all.

According to my invention I provide means whereby, at low rates of flow, the passage of the fluid actuating the rotor is automatically restricted so increasing the velocity of the fluid through the restricted passage or passages sufficiently to compensate for what would otherwise be the slip or leakage at such low rates of flow, thereby causing the meter to register correctly not only at relatively low rates of flow, but also at smaller flow than the meter would otherwise register if the passage were not restricted.

Referring first to Figs. 1 and 2, illustrating one form of meter embodying my invention, 1 designates the casing of the meter, 2 the inlet connection thereof, 3 the outlet connection thereof, and 4 a rotary driving member or rotor, provided with a supporting spindle 5 mounted in suitable bearings, said rotor having helical vanes 6 and intervening helical passages 7, arranged for axial discharge.

8 designates a bearing spider, through a closely-fitting bearing 8$^x$ in which the spindle 5 passes. Beyond said spider, the spindle is provided with a worm 9, forming a part of registering mechanism the other parts of which are not here shown, but which may be of customary construction.

As so far described, the meter is of substantially ordinary construction.

To obstruct the flow through one or more of the passages of the rotor, as low rates of flow, (and thereby to compensate, in the manner above described, for what would otherwise be the slip of the meter at such low rates of flow,) without materially obstructing flow at higher rates of flow, I provide an obstructer or stopper, 10, for one or more of the helical passages 7 of the rotor. In the particular construction shown in Figs. 1 and 2, two such obstructers 10 are provided, for two diametrically opposite passages 7, (though a less or greater number of obstructers, for a less or greater number of passages 7, may be provided at will,) and I have shown such obstructers 10 united to each other and to a guide hub 11 arranged to slide axially on the spindle 5. In the construction shown, the axis of the rotor is supposed to be vertical, and therefore gravity tends to cause the obstructers 10 to fall down on top of the rotor, so closing, more or less completely, two of the passages 7 of the rotor; but the weight of the said obstructers and their hub is such, with reference to the surface exposed to the streams of water or other fluid flowing through the meter, that at rates of flow exceeding that at which the slip of the rotor becomes material, the obstructers 10 will be held well clear of the rotor, by the impact of the streams of water from passages 7 upon them, and therefore at flows exceeding that at which the slip of the rotor becomes material, the obstructers will offer little or no obstruction to the flow of fluid through their corresponding passages 7, and the meter will operate in the ordinary manner. But when the flow through the meter becomes less than that with reference to which the weight and surface of the obstructers are designed, said obstructers will fall, closing more or less completely their corresponding passages 7 of the rotor, and thereby increasing proportionately the rate of flow through the other passages 7, and thereby causing the rotor to revolve at a rate sufficiently greater to cause the meter to register approximately correctly.

It may not be desirable to have the obstructer 10 obstruct completely the flow through their passages 7, in the first instance, and therefore I have shown said obstructers as provided with ports 12; and in order that, when the flow through the meter becomes very small, these ports 12 may be closed, I provide, above the obstructers 10, other obstructers 13, arranged to slide on the hub 11 of obstructers 10, and to act, with respect to ports 12, in the same manner that obstructers 10 act with respect to their corresponding passages 7; but the weight of obstructers 13 is such that they fall and close ports 12 only when the flow through the meter is so low that not even the restriction of some of the passages 7 by obstructers 10 suffices to compensate for the slip of the rotor.

To hold the obstructers 10 and 13 in proper relation to their passages 7 and ports 12, I provide the rotor with a guide pin 14 passing through holes 10$^x$ and 13$^x$ in obstructers 10 and 13.

In the form of meter shown in Figs. 3, 4 and 5, 15 designates the meter casing, 16 the inlet connection thereof, 17 the outlet connection thereof, and 18 a rotor, provided with vanes 19 and intermediate passages 20 arranged for lateral discharge. 21 designates the spindle upon which the rotor is mounted, said spindle having suitable bearings. As in the meter shown in Figs. 1 and 2, the spindle is provided with a worm, here designated by numeral 22, for driving registering mechanism not shown.

In connection with one or more of the passages 20 of rotor 18 I provide obstructers 23, which in the form shown are weighted flap valves, hinged to the rotor. Normally, the weight of these flap valves tends to cause them to restrict the flow through their corresponding passages; but at and above rates of flow determined by the weighting of said valves, the pressure of the water against them causes them to swing outward, the center of gravity of each of these flap valves being lower than the pivotal point when the valve is in the closed position shown in Fig. 3, so that they do not restrict flow through their passages materially; and when the speed of rotation is more than moderate, the centrifugal action of these flap valves tends to hold them out. In these flap valves or obstructers, 23, as in the obstructers 10 of Fig. 1, I may provide ports, numbered 24, and other obstructers, numbered 25, to close said ports when the rate of flow is very low; obstructers 25 being flap valves also, hinged to obstructers 23.

Numerals 26 designate weight masses secured to and in effect forming a part of obstructers 23. By proper selection of weight masses 26 to suit the conditions of use, the meter is readily adjusted to different conditions.

As will be apparent from the foregoing description, the operation of both forms of meter herein illustrated and described, is the same except that in the form of meter shown in Figs. 3, 4 and 5, centrifugal force, as well as impact of the fluid metered on the obstructers, is utilized. This is desirable, since as the rate of flow increases the velocity of rotation of the rotor will also increase, so causing the obstructers to move away from the ports or passages which they guard, a distance corresponding approximately to the increased rate of flow.

As the action of continuous flow or current meters is independent of the pressure to which the fluid metered is subjected, as it passes through the meter, and is dependent merely on the rate of flow, it is relatively easy to determine by test of one meter the number of obstructers required, their weight, the size of ports in said obstructers, the weight of the secondary obstructers to guard such ports, and similar conditions required to enable the meter to meet a close test at all flows; after which, it is easy to make all other meters of the same size to meet the same conditions.

What I claim is:—

1. A continuous flow meter comprising a movable driving member arranged to be operated by the fluid to be metered, in combination with automatic means for increasing, with decreasing rate of delivery, the speed of said driving member with reference to what would be the speed of said driving member at such rate of delivery except for such increase of speed.

2. A continuous flow meter comprising a rotor arranged to be operated by the fluid to be metered, in combination with automatic means for increasing, with decreasing rate of delivery, the speed of said rotor with reference to what would be the speed of said driving member at such rate of delivery except for such increase of speed.

3. A continuous flow meter comprising a movable driving member arranged to be operated by the fluid to be metered, in combination with automatic slip-compensating means arranged to vary automatically the speed of said driving member with reference to varying rates of flow to compensate for variable slip.

4. A continuous flow meter comprising a rotor arranged to be operated by the fluid to be metered, in combination with automatic slip-compensating means arranged to vary automatically the speed of said rotor with reference to varying rates of flow to compensate for variable slip.

5. A continuous flow meter comprising a rotor provided with a plurality of vanes to be acted on by the fluid to be metered, with intervening passages, and automatic obstructing means for one or more of said passages, arranged to obstruct their corresponding passages more or less according to the rate of flow.

6. A continuous flow meter comprising a rotor provided with a plurality of vanes to be acted on by the fluid to be metered, with intervening passages, and automatic obstructing means for one or more, but not all of said passages, arranged to be acted on in one direction by the fluid metered, and in the opposite direction by an opposing force.

7. A continuous flow meter comprising a rotor provided with a plurality of vanes to be acted on by the fluid to be metered, with intervening passages, automatic ported obstructing means for one or more of said passages, arranged to obstruct their corresponding passages at certain rates of flow and to open said passages at other rates of flow, and another obstructer or obstructers for one or more of the ports of said first-named obstructers, said last-named obstructers being arranged in like manner to open and close their corresponding ports.

8. A continuous flow meter comprising a rotor provided with a plurality of vanes to be acted on by the fluid to be metered, with intervening passages, automatic ported obstructers for one or more of said passages, arranged to be acted on in one direction by the fluid to be metered, and in the opposite direction by an opposing force, and other obstructing means for one or more of the ports of said first-mentioned obstructers, and arranged to be similarly acted on by the fluid to be metered and by an opposing force.

9. A continuous flow meter comprising a rotor provided with a plurality of vanes to be acted on by the fluid to be metered, with intervening passages, and automatic obstructing means for one or more of said passages, gravity-actuated in one direction and actuated in the opposite direction by action of the fluid metered.

10. A continuous flow meter comprising a rotor provided with a plurality of vanes to be acted on by the fluid to be metered, with intervening passages, and automatic obstructing means for one or more of said passages, gravity actuated in one direction and actuated in the opposite direction by centrifugal action and the action of the fluid metered.

11. A continuous flow meter comprising a rotor provided with a plurality of vanes to be acted on by the fluid to be metered, with intervening passages, and automatic obstructing means for one or more of said passages, mounted on said rotor and arranged to be actuated in one direction by the action of the fluid metered and in the opposite direction by an opposing force.

12. A continuous flow meter comprising a rotor provided with a plurality of vanes to be acted on by the fluid to be metered, with intervening passages, one or more hinged flap valves secured to said rotor and each arranged to guard a corresponding passage of the rotor, said valve or valves being arranged to be actuated in one direction by the fluid metered and in the opposite direction by an opposing force.

13. A continuous flow meter comprising a rotor provided with a plurality of vanes to be acted on by the fluid to be metered, with intervening passages, one or more hinged flap valves secured to said rotor and each arranged to guard a corresponding passage of the rotor, said valve or valves being arranged to be actuated in one direction by the fluid metered and in the opposite direction by an opposing force, and provided with a port, and another valve for such port similarly actuated.

14. A continuous flow meter comprising a rotor having one or more passages for the flow through it of fluid to be metered, an obstructer valve or valves for said passage or passages, arranged to be actuated in one direction by the fluid metered and in the opposite direction by an opposing force, and a weight secured to each said valve.

15. A fluid meter comprising a movable driving member having passages, and means operated in accordance with variation of rate of flow for varying the flow-capacity of said passages.

16. A fluid meter comprising a movable driving member having passages, and means operated in accordance with variation of rate of flow for closing one or more of said passages.

17. A fluid meter comprising a movable driving member having passages, means operated in accordance with variation of rate of flow for partly closing one or more of said passages, and other means for completing the closing of passages already partly closed.

18. A fluid meter comprising a movable driving member having passages, and means operated in accordance with variation of rate of flow for automatically varying the flow-capacity of said passages.

19. A fluid meter comprising a movable driving member having passages, and means operated in accordance with variation of rate of flow for automatically closing one or more of said passages.

20. A fluid meter comprising a movable driving member having passages, automatic means for partly closing one or more of said passages, and other automatic means for completing the closing of passages already partly closed.

21. A fluid meter comprising a rotor adapted to drive registering mechanism, and means for increasing the speed of said rotor at certain rates of flow.

22. A fluid meter comprising a rotor adapted to drive registering mechanism, and automatic means for increasing the speed of said rotor at certain rates of flow.

23. A fluid meter comprising a rotor having a plurality of passages, and means operated in accordance with variation of rate of flow for varying the flow capacity of said passages.

In testimony whereof I have signed this specification in the presence of two subscribing witnesses.

FRANK LAMBERT.

Witnesses:
H. M. MARBLE,
PAUL H. FRANK.

Copies of this patent may be obtained for five cents each, by addressing the "Commissioner of Patents, Washington, D. C."